United States Patent [19]
Degi et al.

[11] Patent Number: 5,201,014
[45] Date of Patent: Apr. 6, 1993

[54] METHOD AND APPARATUS FOR ESTABLISHING THRESHOLD LEVEL IN A BINARY MODE DOCUMENT SCANNER

[75] Inventors: Greg A. Degi, Fort Collins, Colo.; Graig L. Miller, Boise, Id.; Irene F. Stein, Fort Collins, Colo.

[73] Assignee: Hewlett-Packard Company, Palo Alto, Calif.

[21] Appl. No.: 835,008

[22] Filed: Feb. 12, 1992

Related U.S. Application Data

[63] Continuation of Ser. No. 477,286, Feb. 8, 1990, abandoned.

[51] Int. Cl.⁵ .............................................. G06K 9/38
[52] U.S. Cl. ...................................... 382/51; 358/466
[58] Field of Search ........................... 382/50, 51, 53; 358/462, 464, 466

[56] References Cited

U.S. PATENT DOCUMENTS

| | | | |
|---|---|---|---|
| 4,468,703 | 8/1984 | Fujiwara et al. | 382/51 |
| 4,656,665 | 4/1987 | Pennebaker | 358/466 |
| 4,710,822 | 12/1987 | Matsunawa | 358/466 |
| 4,847,912 | 7/1989 | Tanaka et al. | 382/51 |
| 4,907,286 | 3/1990 | Yamada | 382/51 |
| 4,977,605 | 12/1990 | Fardeau et al. | 358/466 |
| 5,025,480 | 6/1991 | Morton et al. | 382/51 |

FOREIGN PATENT DOCUMENTS 61-201105 9/1986 Japan .

Primary Examiner—Leo H. Boudreau
Assistant Examiner—David Fox

[57] ABSTRACT

In a document scanner that is operating in the binary mode, the magnitude of the signal that is generated for each picture element (PEL) of each document scan line is compared to the magnitude of a threshold signal. Either a binary 0 or a binary 1 is generated as a result of this comparison. The threshold signal magnitude is dynamically established by a method and an apparatus that provides a stored history or histogram of the various signal magnitudes that are generated for each PEL of a plurality of the document scan lines. Since the signal magnitude(s) that is provided by scanning the background, non-image, area of the document occurs the majority of the time within this histogram, the magnitude of this majority signal(s) is used to set the threshold signal magnitude. As a result, the PELS of the document's visible image are converted to a binary electronic image with a minimum loss of visual image content. The threshold signal magnitude is continuously established in this manner during the scanning of a document.

16 Claims, 5 Drawing Sheets

METHOD AND APPARATUS FOR ESTABLISHING THRESHOLD LEVEL IN A BINARY MODE DOCUMENT SCANNER

CROSS REFERENCE TO RELATED APPLICATION

This is a continuation of copending application Ser. No. 07/477,286 filed on Feb. 8, 1990, now abandoned.

DESCRIPTION

1. Field of the Invention

The present invention relates to document scanners, and more specifically to a method and an apparatus for determining the optimum threshold signal level to be used when a document scanner is operating in the binary mode.

2. Background of the Invention

In a document scanner of the type in which the present invention finds utility, the scanner is conventionally provided with a platen whereat a document is positioned for scanning.

The document is illuminated during scanning by the use of a line or footprint of light that extends in what is defined as the X direction. The line of light moves relative to the document in what is defined as the orthogonal Y direction. Light is thus reflected from the document in a line by line or row by row fashion, each document row extending in the X direction. In the case of a document comprising a black line or text image on white paper, high intensity light is reflected from the document's white background PEL areas, intermediate intensity light is reflected from the document PELS that contain only a portion of the document's image, and low intensities of light are reflected from the document's black image PEL areas.

The platen may comprise a horizontal, rectangular, transparent glass or glass-like member on which the document is placed in a stationary manner for scanning by a moving light footprint, or the platen may comprise a thin glass strip that is located coincident with a stationary light footprint, and over which the document is moved during scanning.

In either event, a line or footprint of reflected light is optically directed onto a linear array of light sensitive cells that effectively extend in the X direction. An example of such an array is a CCD array whose individual cells each define one picture element, pixel, or PEL of the light footprint. Each individual sensor cell of the array defines a document scan column that extends in the Y direction.

The scanner apparatus can be used to either scan the entire document, or to scan an internal portion or window thereof. In the case of a request to scan a window area within the document, this window area is defined by giving the X and Y coordinates of the window area, referenced to the X-Y coordinate system that is defined by the platen and by movement of the light footprint. When a request is received by the scanner apparatus to scan a document, or to scan a window within the document, the analog signal content of the sensor array cells must be interrogated in relation to the Y direction position of the light footprint relative to the document, and in addition only those sensor cells that actually view the document, or view a document window, are read out into image memory. The above mentioned CCD array is operable to provide an analog signal output for each individual sensor cell thereof. The magnitude of this signal depends upon the reflectance characteristics of the document PEL then being viewed by the cell. Thus, when a high reflectance PEL is being viewed (i.e. a PEL within the document's white background areas) a high magnitude output is provided, when an intermediate reflectance PEL is being viewed (i.e. a document PEL that contains only a portion of the document's black line image) an intermediate output is provided, and when a low reflectance PEL is viewed (i.e a document PEL containing only the black line image) a low magnitude signal is provided.

Document scanners typically operate in one of two modes of operation. A first mode of operation is particularly suited for the scanning of documents that include a multiple shades of grey image, of which a photograph is an example. In this case, an electronic signal processing means is provided to resolve the analog output of each sensor cell into one of a large number of possible binary values. For example, the analog signal output from a sensor cell for a document currently being viewed is resolved into an 8-bit binary word whose magnitude can span a range having 256 different values from 0000,0000 to 1111,1111.

In a second mode of operation of the scanner apparatus, defined herein as the binary mode of operation, the scanner device is best suited to scan a line or a text document, of which a typewritten page of text is an example. In this case, the analog output from each sensor cell again may span a substantial magnitude range. However, in this second mode of operation the above mentioned electronic signal processing means must be capable of resolving the various 8-bit bytes that are generated from the analog signals into but one of two binary values, namely into 0 or 1. This operation requires the use of a predefined threshold signal magnitude (i.e. a byte magnitude somewhere intermediate the magnitudes 0000,0000 and 1111,1111) against which the various 8-bit sensor cell magnitudes are compared.

In this way, a document that actually has PELS of many reflectance characterists, but which in terms of visual information content has PELS of only two reflectance states (i.e. only white background PELS and dark image PELS), is converted into a binary electronic image, this binary electronic image being a duplicate of the visual information content that is carried by the document.

The present invention finds primary utility in scanner apparatus operating in the binary mode.

As is well appreciated by those skilled in the art, documents that are presented to a scanner apparatus for scanning may include a very wide variety of background shades or colors other than white, a wide variety of substrate or paper thickness and/or optical transparency, and a number of conditions that result from improper handling of the documents. In addition, it has been found that all of these variable document conditions may not only vary from document to document, but also may vary within the body of a single document. In order to accommodate these document variables, the art has provided ways to adjust the threshold level of a binary mode scanner in an attempt to optimize conversion of the document's visual image into a binary electronic image. For example, the operator may view a document and make a judgement as to what threshold value to use, which judgement is based upon the average reflectance of the document, or in the case of a scanner having means to view the electronic image, such as a CRT, perhaps the document is scanned in an iterative fashion until a satisfactory result is achieved.

Thus, there remains a need in the art to provide an automatic method and apparatus for determining the threshold level to be used when a scanner apparatus operates in the binary mode, and particularly an automatic method and apparatus that is responsive only to the background reflectance level of the document, and is not responsive to an average reflectance value of the document.

SUMMARY OF THE INVENTION

The present invention provides a document scanner method and apparatus for binary mode document scanning in which the scanner's threshold signal level is dynamically established by making reference to a stored collection, history, or histogram of the various signal magnitudes that are generated by the various PEL tones of one or more document scan lines. As used herein the term tone is intended to mean the reflection characteristic of a document PEL. Also, as used herein the terms scan line and scan row are to be considered synonymous.

As used herein, the term binary mode scanning of a document is intended to mean a mode of operation in which the scan signal magnitude that is generated for each pixel, picture element or PEL of each document scan line is compared to the predefined magnitude of a threshold signal. If the scan signal magnitude is below the threshold signal magnitude, an image signal of one binary state is generated (i.e. either a binary 0 or a binary 1). If the scan signal magnitude is above the threshold signal magnitude, an image signal of the other binary state is generated.

The present invention finds primary utility when scanning line-type documents, for example., documents containing a human readable text image or line drawing image that is viewed against a background color tone. However, the spirit and scope of the invention is not to be limited thereto since the invention finds utility in the binary mode scanning of any document wherein the majority of the PELS within the document contain only the document's background color tone.

Consider for the moment a typewritten page comprising black human readable text on the surface of a white sheet of paper. For this type of exemplary document, the scan signal magnitude(s) that is provided by the white background, non-image, PEL areas of the document occur the majority of the time within each and every document scan line, and in some scan lines these PEL areas occur all of the time.

In accordance with the invention, a histogram technique is used to achieve automatic background control in a binary mode scanner apparatus. More specifically, the magnitude of the above mentioned majority signal (i.e. background signal) is found by providing a stored collection or histogram of the various scan signal magnitudes within one or more scan lines, and then analyzing this histogram to determine the magnitude of the majority signal.

Since the magnitude of this majority signal is an accurate measurement of the scan contrast that exists between this document's non-information-carrying white background of the sheet of paper, scanning of the document is enhanced in accordance with the invention by establishing the magnitude of the threshold signal as a function of the magnitude of this majority signal.

While it is convenient to think in terms of a conventional dark-tone image viewed against a light-tone background, the invention is not to be limited thereto, since utility is also found in the case of a light-tone image viewed against a dark-tone background. In either case the PELS of the document's visual image are converted to a binary electronic image with minimum loss of image content.

In an embodiment of the invention, the threshold signal level is continuously established or initialized in the above described manner during the scanning of a document. In this way, a change in background color tone that may occur within the document's scan length is compensated. This feature of the invention will also compensate for other factors that make the document's effective background color tone appear to change, for example a change in sean illumination intensity.

It is an object of the invention to provide a binary mode document scanner method and apparatus wherein a signal magnitude collection is provided which contains the plurality of signal magnitudes that are generated for the PELS of at least some of the plurality of document scan rows or lines. This histogram is then analyzed to determine the most frequent occurring signal magnitude in the histogram (i.e. to determine the signal that is generated by scanning the document's background used to determine the magnitude of the scanner's threshold signal.

A further object of the invention is to provide a method and an apparatus whereby the scanner's threshold magnitude is dynamically and periodically adjusted during a document scan, to thereby modify the magnitude of the threshold signal in the event that the effective background color tone of the document changes as the document is scanned.

These and other objects and advantages of the invention will be apparent to those of skill in the art upon reference to the following detailed enabling description of preferred embodiments thereof, which description makes reference to the drawing.

DETAILED DESCRIPTION OF THE INVENTION

Figure 1:
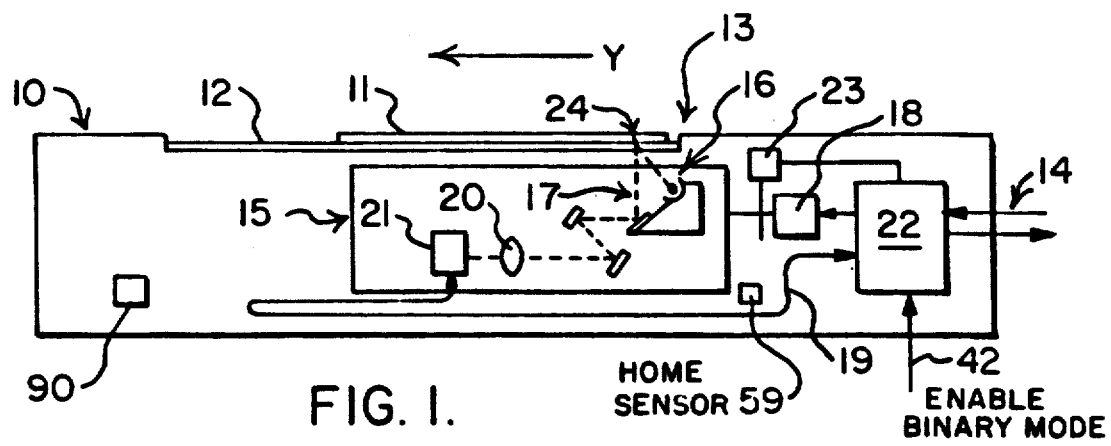
FIG. 1 is a partially schematic side view of a document scanner apparatus embodying the invention.

A document scanning apparatus 10 embodying the present invention is shown in FIG. 1. While this scanner apparatus is of the general type in which the present invention finds utility, the invention is not limited to the specific arrangement of the apparatus as disclosed.

In this scanner apparatus, a document 11 is shown positioned on transparent platen 12 with an image side facing down. The downward facing side of document 11 is scanned so as to convert the visual image contained thereon into an electronic image form that is useable by data processing machines and the like, for example host 45 of FIG. 4. Generically, scanner apparatus 10 is of the stationary document, moving light source type. However, within the spirit and scope of the invention the scanner apparatus may provide a moving document and a stationary light footprint.

Document scanning is accomplished in FIG. 1 by movable carriage 15 which contains a linear light source 16 and an array 17 of reflecting mirrors. Motor 18, which preferably is a stepping motor, is mechanically coupled to carriage 15 as by means of gears, cables or the like. Motor 18 operates to move carriage 15 bidirectionally along the length of platen 12. Movement to the left in FIG. 1 is defined as scan movement, whereas movement to the right is defined as homing movement. The direction of this movement is defined herein as the Y direction, as is shown in FIG. 1 by an appropriately labeled arrow. The light footprint 24 that is reflected from platen 12 is redirected into lens 20, and then into light sensor means 21, best seen in FIG. 3. CCD array 27 is of an X direction effective length that is substantially coincident with the length of light footprint 24.

Light source 16 operates to provide a relatively thin light footprint 24 that spans the X direction or width of platen 12. The home position of carriage 15 and light footprint 24 is such that the line of light illuminates the opaque leading edge portion 13 of platen 12

Figure 3:
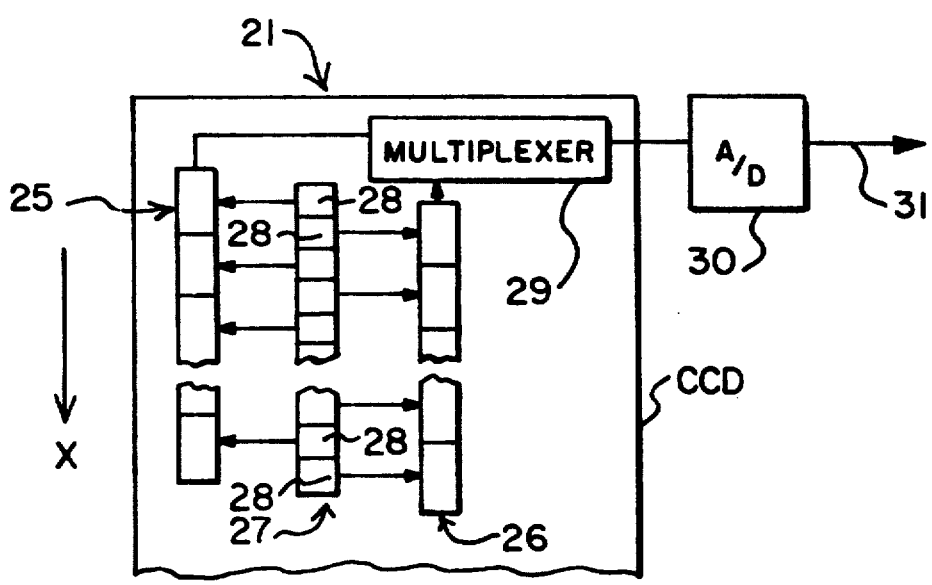
FIG. 3 is a partially broken away schematic view of the CCD array of FIG. 1, and of the circuitry and logic for handling and digitizing the analog signals that are provided by the individual CCD sensor cells as a result of the light footprint that is reflected to the CCD sensor.

With reference to FIG. 3, light sensor means 21 is preferably a charge coupled device (CCD) assembly or array 27 that is configured as a linear array of individual light sensitive detector cells 28. Each detector cell 28 of sensor array 27 defines a picture element or pixel (PEL) within the linear scan line that is defined by light footprint 24. CCD arrays that can distinguish a variety of PEL densities on document 11 (for example 400 PELS per document inch) are readily available from contemporary commercial sources and provide high quality resolution.

Figure 2:
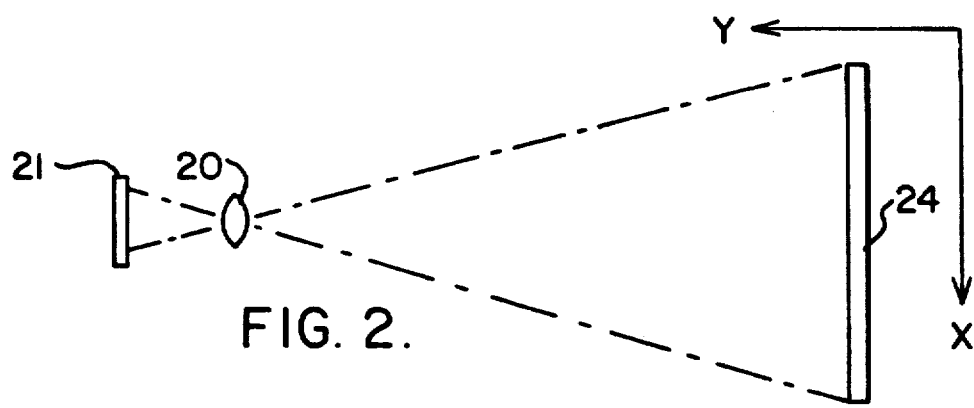
FIG. 2 is a linearized presentation of the document object plane to CCD array image plane light reflection path of the FIG. 1 scanner.

In FIG. 2, a typical document scan line footprint 24 (also see FIG. 1), comprising an exemplary length of 3,400 PELS (i.e. 400 PELS per inch of a document that is 8¼ inches wide). As a result of footprint 24 passing through lens 20, the footprint is optically reduced in length in a predetermined ratio (eg: 7.5:1) upon reaching CCD array 27. The analog signal content of light sensor means 21 is periodically read out, document line by document line, as carriage 15 moves in the Y direction along the length of platen 12.

When a document scan has been completed, carriage 15 returns to a home position (movement to the right as viewed in FIG. 1) and then stops with light footprint 24 positioned upstream of the leading edge 13 of platen 12 (i.e. to the right of the position of footprint 24 as shown in FIG. 1).

The output scan signals from light sensor means 21 are coupled through flexible cable 19 (31 of FIG. 4) to electronic controller 22, after conversion of the output signals to digital form, as is described below in connection with FIG. 3. Controller 22 provides drive signals to carriage motor 18. Controller 22 may operate to control motor 18 in an open loop or closed loop servo mechanism manner. In a preferred embodiment, controller 22 receives position or movement feedback information relative to carriage 15, such as from the output of a tachometer position detector 23, and receives carriage position feedback from home sensor 59 and from end of scan sensor 90.

Figure 4:
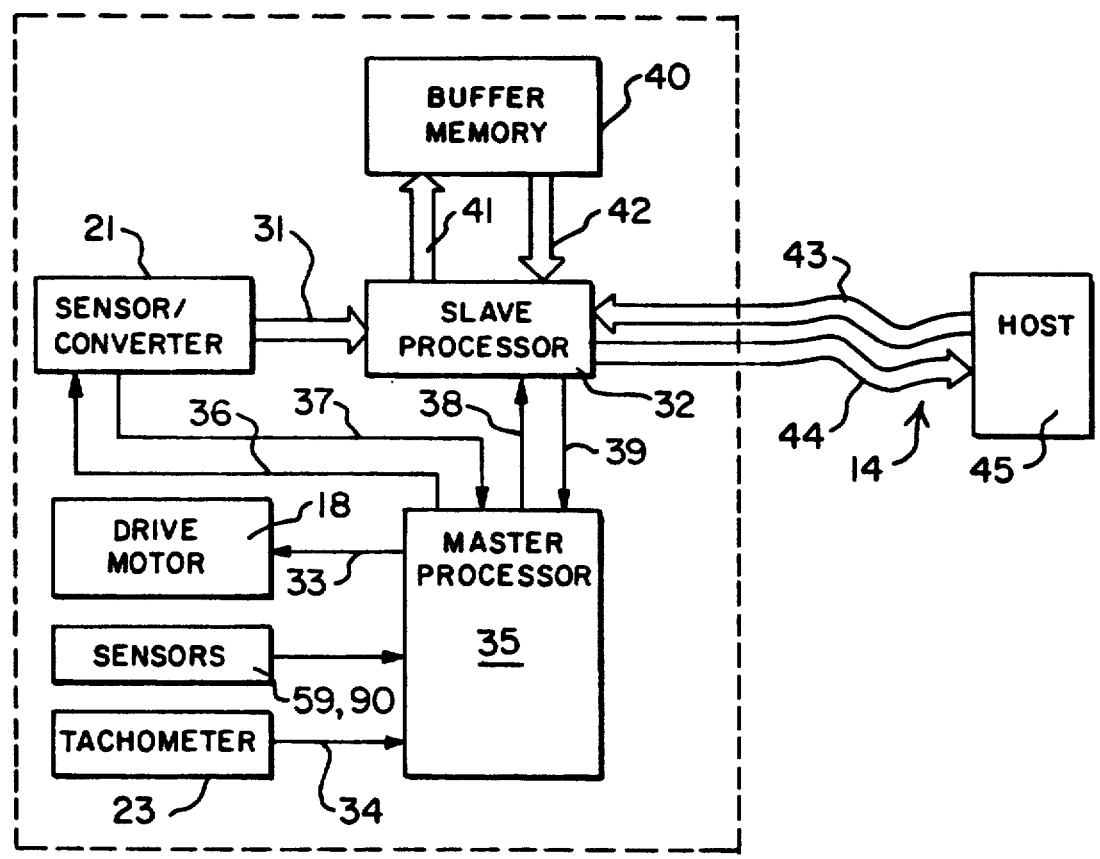
FIG. 4 is a block diagram showing the organization and arrangement of processor controlled logic and circuitry that is incorporated in the scanner of FIG. 1.

Controller 22 incorporates data processing and handling elements for exchanging data and signals with a remote host or processor 45 (FIG. 4) by way of output cable 14 (43, 44 of FIG. 4). The operation of controller 22 is described in greater detail in conjunction with FIG. 4.

FIG. 3 illustrates an embodiment for reading out the data content of light sensor means 21. By means of gating signals (not shown), typically from controller 22, the analog signal content of every other detector cell 28 of CCD array 27 is coupled in parallel into analog shift register 25, while the signals present in the other intervening cells 28 are coupled in parallel into analog shift register 26.

The analog signals loaded into registers 25 and 26 are representative of the various light levels that are reflected from the individual PELS of light footprint 24, as these light levels are received by the like number of individual cells 28 of CCD array 27. The individual analog magnitudes correspond to the average of the light quantity that is reflected from a small incremental pixel or PEL of light footprint 24 over a predetermined period of time. After these signals are transferred into registers 25 and 26, the signals are shifted serially through multiplexer 29 into analog to digital converter (A/D) 30. A variety of appropriate analog to digital converters are commercially available for this purpose.

Output 31 of A/D 30 comprises a sequence of bytes of binary data, for example, one byte of data for each PEL. Each of those bytes corresponds digitally to the magnitude of a discrete one of the analog signals retrieved from shift registers 25 and 26, and thus each byte corresponds to the magnitude of reflected light present at one of the cells 28 of CCD array 27. If array 27 images 400 cells or PELS per inch, output 31 of A/D 30 comprises a similar 400 bytes per inch.

In the document scanner of FIG. 1, document 11 is illumination during scanning by the use of light footprint 24 that extends in what is defined as the X direction. Light footprint 24 moves relative to document 11 in what is defined as the orthogonal Y direction. Light is thus reflected from document 11 in a line by line or row by row fashion, each document row extending in the X direction. In the case of a document comprising a black line or text image on white paper, high intensity light is reflected from the document's white background PEL areas, intermediate intensity light is reflected from the document PELS that contain only a portion of the document's black image, and low intensities of light are reflected from the document's black image PEL areas.

A line or footprint of reflected light (24 of FIG. 2) is optically directed onto the linear array of light sensitive cells 28 that effectively extend in the X direction. Each individual sensor cell 28 of array 27 defines a document scan column that extends in the Y direction.

Scanner apparatus 10 (FIG. 1) can be used to either scan or read the entire surface of document 11, or to scan an internal portion or window therein. In the case of a request to scan a window area within document 11, this window area is defined by giving the X and Y coordinates of the window area referenced to the X-Y coordinate system that is defined by platen 12 and by movement of the light footprint 24.

When a request is received by scanner apparatus 10 to scan a window within document 11, the signal content of sensor cells 28 must be interrogated in relation to the Y direction position of the light footprint relative to the document window, and in addition only those sensor cells 28 that actually view the document window's X dimension width are read out into image memory 40 of FIG. 4.

Document scanner 10 is capable of operating in one of two modes of operation. The first mode of operation (i.e. the default mode of operation) is particularly suited for the scanning of documents that include shades of grey image, of which a photograph is an example. In this case, controller 22 resolves the analog output of each sensor cell 28 into one of a large number of binary values. For example, the analog signal output from a sensor cell 28 for a grey scale document 11 is resolved into an 8-bit binary word whose magnitude can span the magnitude range from 0000,0000 to 1111,1111. Thus, the information content of this 8-bit image signal retains the information content that is present in the document's grey scale image PEL.

In a second mode of operation of scanner apparatus 10, defined herein as the binary mode of operation, the device is best suited to scan a line document 11, of which a typewritten page of text is an example. In this case the analog output from each sensor cell 28 again may span a substantial 8-bit magnitude range. However, in this second mode of operation controller 22 operates to resolve the various multi level 8-bit bytes into but one of two binary values, namely into 0 or into 1. This operation requires the use of a predefined threshold signal magnitude (i.e. a byte whose magnitude is somewhere intermediate the two magnitudes 0000,0000 and 1111,1111) against which the various 8-bit sensor cell magnitudes are compared. In this case, PELS of an intermediate reflectance characteristic are resolved into one of these two binary states.

The convention that will be used in the following description, but without limitation thereto, is that byte 1111,1111 represents the lightest color, highest reflectance shade PEL and byte 0000,0000 represents the darkest color, lowest reflectance shade PEL. Usually, the threshold signal resolution of mid-shade PELS into a binary image signal is performed so as to minimize loss of the information content of a dark visual image that is viewed against a light background.

In this way, a document 11 that actually has PELS of many reflectance characteristics, but which in terms of visual information content contains PELS of only two reflectance states (for example, only white background PELS and dark image PELS), is converted into a binary electronic image, this binary electronic image being a duplicate of the visual information content that is carried by such a document 11.

The present invention finds primary utility when scanner apparatus 10 is operating in the binary mode. In accordance with the invention, a control input conductor 42 (43 of FIG. 4) places scanner apparatus 10 in its binary mode of operation when an active signal is present on conductor 42. Scanner apparatus 10, when in the binary mode of operation, may operate with either a fixed value of threshold signal, or may operate with a threshold signal whose value is periodically and automatically determined in accordance with this invention.

As is well appreciated by those skilled in the art, line type documents, of which a typewritten page is an example, are delivered to scanner apparatus 10 for scanning with a very wide variety of background shades, a wide variety of substrate color and thickness, a wide variety of optical transparency, and in a wide variety of conditions that result from improper handling of the documents. In addition, all of the document parameters that contribute to the document's reflectance characteristics, but do not carry visual information, may vary within the body of any single document.

In order to accommodate these document variables, the present invention provides a method and an apparatus for determining the threshold signal level or magnitude that will be used when scanner apparatus 10 operates in the binary mode with automatic background control selected by use of the control signal(s) present on conductor 42. As will be apparent, the automatic background control of the present invention is responsive only to the background reflectance level of document 11, and is not responsive to an average reflectance value of the document.

Prior to describing the invention in detail with reference to FIGS. 5-8, the general organization of the major electrical and electronic elements associated with the scanning of a full document or a document window will be described with reference to FIG. 4.

In a manner well known to those of skill in the art, master central processing unit (CPU) 35 controls movement of carriage 15 (FIG. 1) by way of appropriate activation signals on line 33 to motor 18, in conjunction with a carriage position feedback signal that is provided by carriage position tachometer 23 on line 34, and in conjunction with the output of carriage position sensors 59 and 90. Sensors 59 and 90 may, for example, comprise a stationary light beam that is momentarily broken by a flag that is mounted on carriage 15.

In addition, master CPU 35 turns on and off the CCD cell sampling, and the analog-to-digital conversion of the cell contents of light sensor means 21, via a two-way control signal dialog that is conducted on lines 36 and 37.

The digital byte data that is provided by the output of light sensor means 21 (i.e. the output 31 of A/D 30 of FIG. 3) is presented in parallel to slave processor 32 by way of bus 31. Processor 36 inserts the bytes of data into storage locations in buffer memory 40 by way of cable 41. Slave processor 32 receives and stores the data in response to initiating commands that are received from master CPU 35 via line 38, and continuously informs CPU 35 of its status and operation by way of line 39.

Slave processor 36 is also in two-way communication with an exemplary remotely located host data handling unit 45 via communication links 43 and 44 (14 of FIG. 1). While parallel bit, multiple line cables provide interface 43, 44 between host 45 and slave processor 36, a variety of alternate data transmission disciplines are also available for this purpose, including means such as modems, fiber optic communications, etc.

Figure 5:
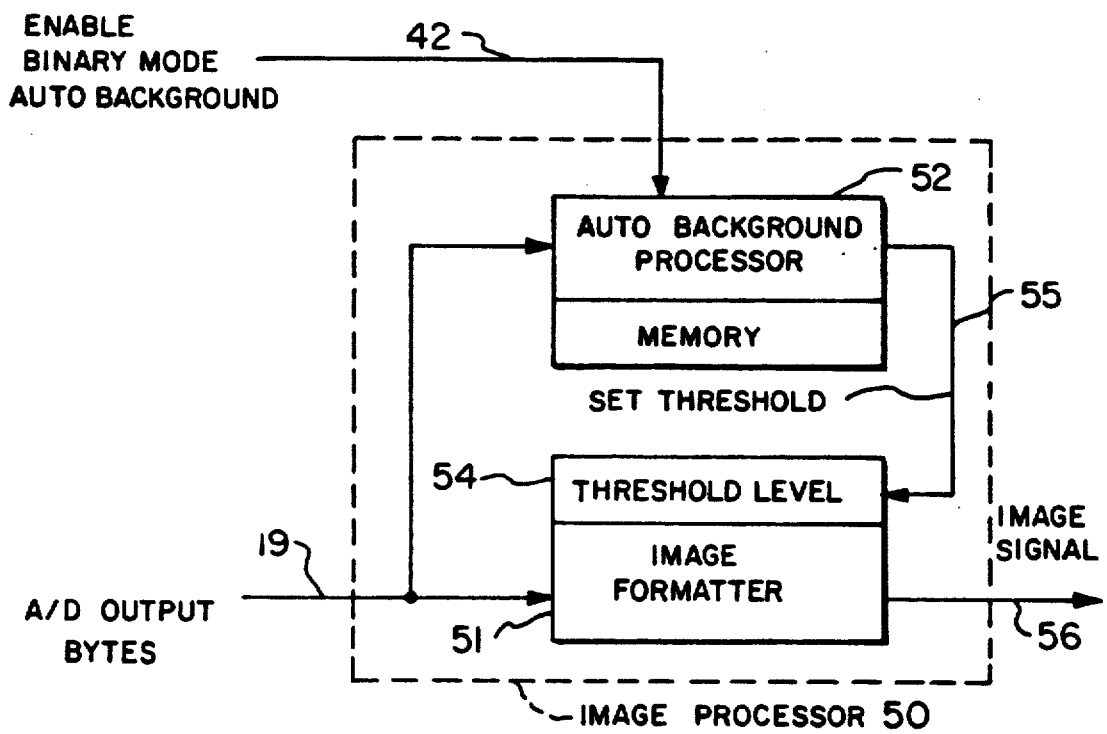
FIG. 5 is a first embodiment of a binary mode image processor in accordance with the present invention for use in the logic and circuitry of FIG. 4 in which the threshold signal magnitude is set scan line by scan line.

With reference to FIG. 5, this FIGURE discloses an embodiment of a binary mode image processor 50 that is contained within slave processor 32 of FIG 4. The magnitude of the binary mode threshold signal 54 is set periodically in FIG. 5, for example scan line by scan line, in accordance with the present invention.

In this FIGURE the 8-bit scan signal output of A/D 30 (FIG. 3) is present on cable or bus 19. As above mentioned the binary magnitude of this 8-bit signal may span a decimal value range from 0 to 255.

This multi-level binary signal is provided as an input to image processor logic network 50. Network 50 may include a number of well known image processing and enhancing functions which are not important to the utility of the invention, such as image scaling for example.

In accordance with this embodiment of the invention, image processor 50 includes image formatting logic network 51 and autobackground processor 52.

When the scanner apparatus of FIG. 1 is enabled to operate in the binary mode with autobackground enabled, the signal present on line 42 is active. As a result, processor 52 will operate periodically to analyze the scan byte content of the scan lines of document 11 (for example every document scan line or row) in order to update the signal threshold magnitude that is stored in portion 54 of image formatter 51. When the scanner apparatus is enabled to operate in the binary mode, but the signal on line 42 is not active, a default threshold signal is stored in portion 54 and is used during the scanning of document 11.

In either case, formatter 51 operates to compare the magnitude of each scan signal byte on cable 19 to the magnitude of threshold 54, and then operates to provide a binary output, that is bit 0 or bit 1, as a result of that comparison. In order to achieve efficient data transfer, eight such scan PEL bits are packed into one byte, and this packed byte is then placed on output bus 56 (also see 14 of FIG. 1 and 44 of FIG. 4).

Assuming an active signal on line 42, processor 52 continually reads the magnitude of the A/D scan bytes present on cable 19, as these bytes continue to sequentially occur within a predetermined quantity of document scan data, for example within one document line. The most often occurring individual byte value (or perhaps a range of values) within this predetermined quantity of scan data is then used by processor 52 to establish a threshold magnitude for portion 54 of formatter 51. This threshold magnitude is then used by image formatter 51 to convert scan data 19 to binary magnitudes 56 as the next predetermined quantity of scan data 19 arrives. Also, as this next quantity of scan data arrives, processor 52 again operates to determine a new threshold magnitude for portion 54, if such a new magnitude is in fact required.

In this way, image formatter 51 converts A/D output 19 to one of two binary states using a threshold magnitude 54 that is a function of only the document's background reflectance characteristics, i.e. a function of only the document's most often occurring A/D output on cable 19.

The embodiment of the invention shown in FIG. 5 provides the utility of updating signal threshold level 54 every time a unit quantity of scan signals 19 are analyzed. In this assumed case the unit quantity equals 3,400 scan bytes (i.e. 400 PELS per inch of an 8½ inch document). However, for conventional documents 11, and within the spirit and scope of this invention, it is usually not necessary to update threshold level 54 on a line by line basis.

Figure 6:
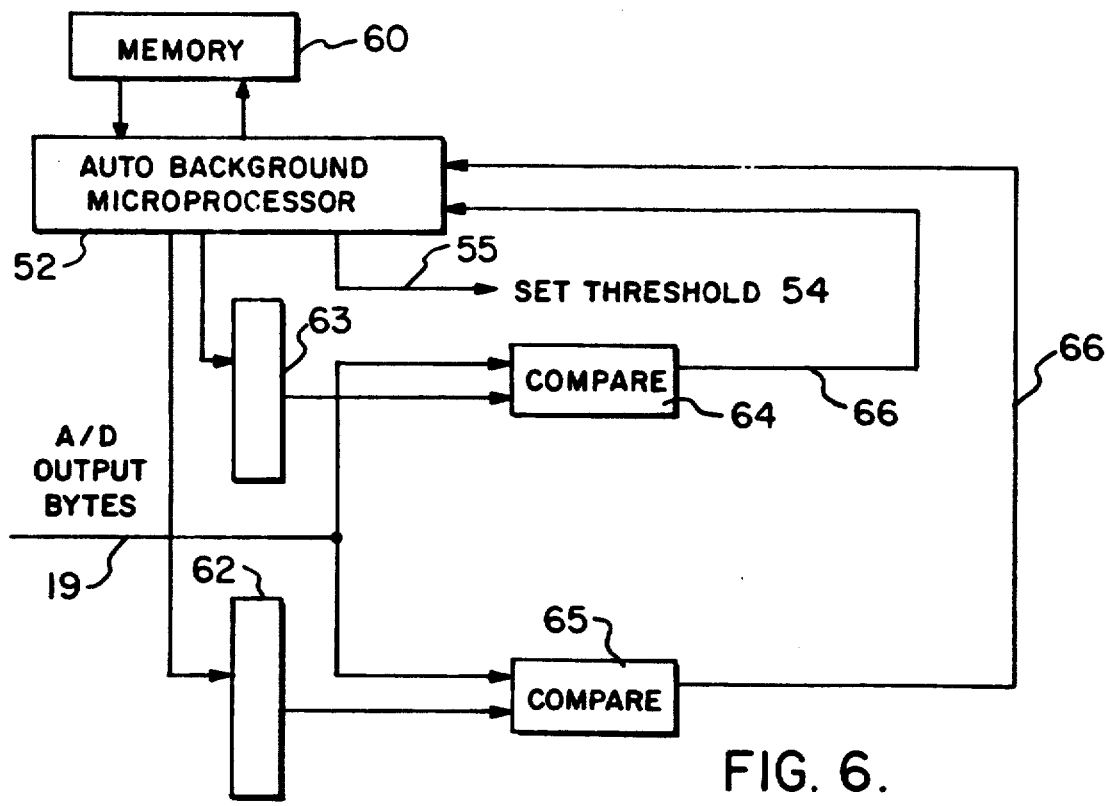
FIG. 6 is another embodiment of a binary mode image processor in accordance with the present invention for use in the logic and circuitry of FIG. 4 in which the threshold signal magnitude is set for every group of eight document scan lines.

FIG. 6 provides an embodiment of the invention wherein threshold level 54 of FIG. 6 is updated less frequently than in FIG. 5 as document 11 is scanned. More specifically, in FIG. 6 the magnitude of threshold signal 54 is reset by the output on line 55 at a frequency of once for every group of eight document scan lines FIG. 7 shows the organization of the scan signal memory 60 that is used in this embodiment of the invention.

Figure 7:
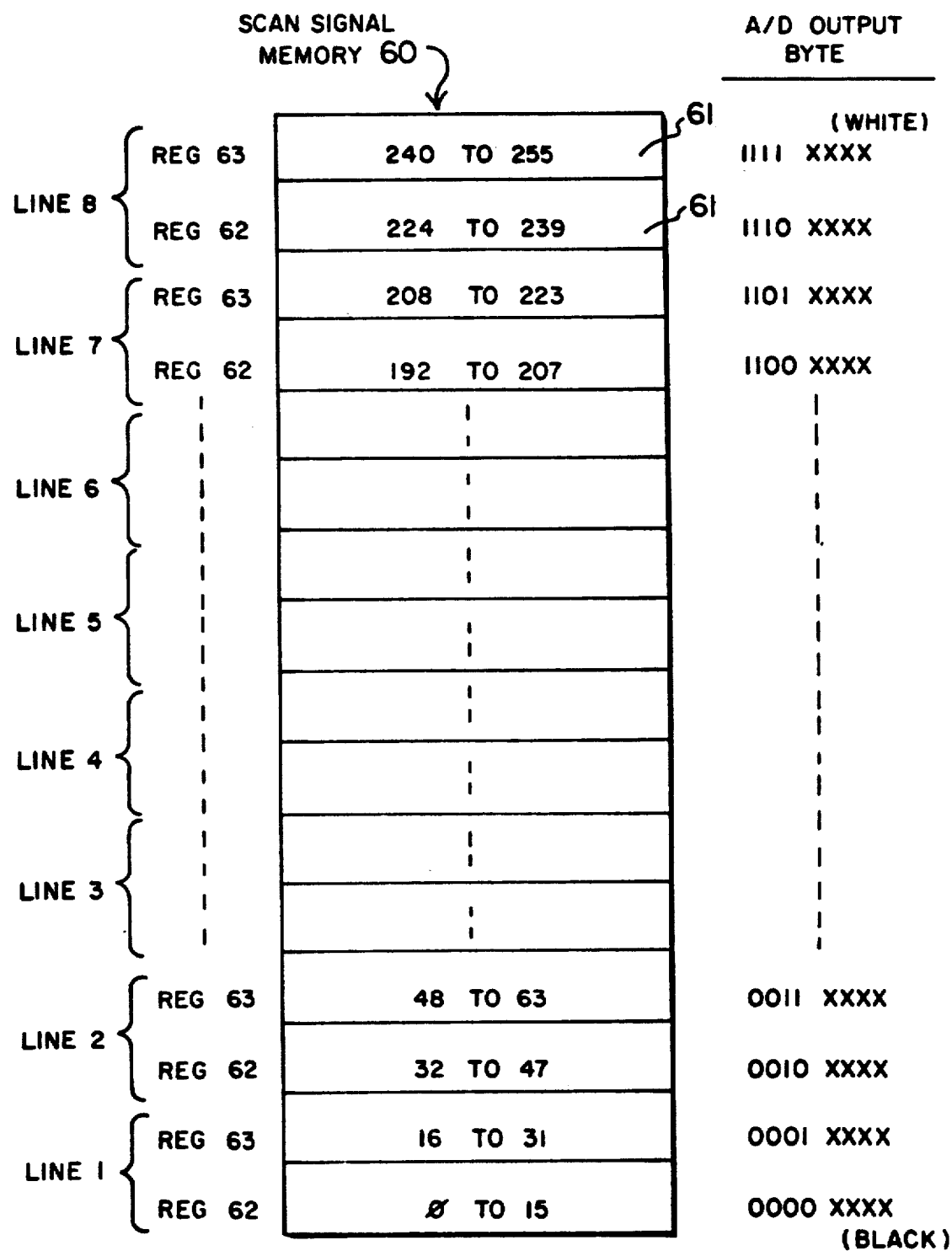
FIG. 7 shows the structure of the scan signal memory of FIG. 6, and shows how the 256 possible scan signal magnitudes are collected in sixteen memory locations as a result of scanning eight consecutive document lines of rows.

FIGS. 6 and 7 will be explained with reference to scan signals that again comprise one 8-bit byte for each PEL of each document scan line. However, the invention is not to be limited to this convention. As a result of using this convention, input cable 19 provides byte signals that span a decimal range of values from 0 to 255. While apparatus within the teaching of this invention might operate to investigate the scan signal population with respect to all 256 of these individual signal levels, such is not normally necessary. Thus, in FIGS. 6, 7 this range of 256 possible scan signal values is broken down into sixteen equal size ranges, each range containing sixteen different scan signal values.

In FIG. 7 sixteen memory storage locations 61 of scan signal memory 60 each contain a legend indicating the sixteen scan signal decimal values that are counted by operation of FIG. 6. The column to the right of memory locations 61 contains the A/D output bytes on cable 19 that operate to increment the content of the adjacent memory location 61 by one count. For example, the lowermost memory location 61 will count the number of scan signal bytes 19 that fall within the decimal value range from "0 to 15", i.e. all sixteen binary bytes within the byte range 0000, XXXX (where X designates the don't care state of a bit). At the beginning of an 8-scan-line cycle all storage locations 61 are initialized to contain a count of 0.

Without limitation of the invention to this convention, the lowermost memory location 61 will contain a count of the document's darkest PELS, whereas the uppermost memory location 61 will contain a count of the document's lightest PELS.

With reference to FIG. 6, microprocessor 52 is operable to effectively load two different binary bytes, spanning the byte range from 0000,XXXX to 1111,XXXX, into registers 62 and 63 in a repeating 8-scan-line cycle, as is indicated by the column that is positioned to the left of memory locations 61 in FIG. 7.

Again for purposes of efficiency, microprocessor 52 preferably loads only one byte to registers 62, 63, wherein the top 4-bits (nibble) of the byte are loaded into one register, for example register 62, and the bottom nibble of the byte is loaded into the other register. For example, at the beginning of an 8-scan-line cycle, designated line 1 in FIG. 7, register 62 has the nibble 0000 loaded therein (i.e. scan signal decimal values in the range from 0 to 15), and register 63 has the nibble 0001 loaded therein (i.e. scan signal decimal values in the range from 16 to 31).

Assume now that the next scan signal byte present on cable 19 is the byte 0001, 0010 (i.e. a scan signal decimal value of 20). Such a scan signal byte magnitude might originate from a document PEL containing a portion of the document's high reflectance visible image. This byte value on cable 19 is connected to two comparator networks 64, 65. These comparator networks operate to compare the byte magnitude currently present on cable 19 to the byte magnitudes that are currently stored in registers 62 and 63, respectively, as is shown in FIG. 7.

As a result of this assumed scan signal byte being present on cable 19, comparator 64 detects a compare condition (i.e. 0001, 0010 is compared to 0001,XXXX) and provides an active output to microprocessor 52 by way of line 66.

As a result, microprocessor 52 operates to increment the count that is stored in the memory location 61 that is labeled "16 to 31" in FIG. 7 by one count.

As is apparent to those of skill in the art, an equivalent means (not shown) to the arrangement shown in FIG. 6 provides two hardware counters, one at the output of each of the two comparators 64, 65. These two counters operate to accumulate a count of the number of occurrences of the byte values shown in FIG. 7, on a line by line basis, and for each of the lines of an eight scan line cycle. At the end of each line within this cycle, microprocessor 52 reads the content of these two counters, stores their count content, and resets the counters to zero in preparation for the next scan line of the cycle. At the end of an eight scan line cycle, microprocessor 52 has assembled a histogram of count values. Microprocessor 52 then determines which of the sixteen stored count values is in the majority, and this majority value is then used by microprocessor 52 to determine a threshold signal to be placed on line 55.

In FIG. 6, the content of the sixteen memory locations in memory 60 comprises a similar histogram of the overall reflectance characteristic of an 8-scan-line band that extends across document 11 in the X direction.

In accordance with the invention, microprocessor 52 now interrogates all storage locations 61 in memory 60 and determines which of the storage locations 61 contains the highest count. The value of this highest count is then used to determine a threshold signal value to be placed on line 55. The count contained in all other storage locations 61 is then disregarded, since in accordance with the invention, threshold signal 54 (FIG. 5) of formatter 50 is determined only by the background reflectance characteristic of document 11.

The threshold signal present on line 55 at any given time is used by image formatter 51 (FIG. 5) during a current eight line scan cycle in order to convert the A/D output bytes on cable 19 into packed binary output bytes on cable 56. At the same time, the apparatus of FIGS. 6, 7 operates to recalculate a new threshold signal 55 which is based upon the byte value population within this current eight line scan cycle.

For example, assume that document 11 comprises a black typewritten human readable text on white tone paper. In this case, the memory location labeled "224 to 239" would likely contain the highest count at the end of an 8-scan-line cycle. As a result, threshold signal level 54 of FIG. 5 would be set to a value of perhaps 0111, 0000 (decimal 112) for the best resolution of the document3 s black text image. In this case, all scan byte values on cable 19 that are below the assumed magnitude 0111, 0000 would be resolved into a binary output of 0 by image formatter 51 (FIG. 5) for packing into an image byte on line 56 (14 of FIG. 1 and 44 of FIG. 4), and all scan byte values on cable 19 that are above the magnitude 0111, 0000 would be resolved into a binary output of 1.

Figure 8:
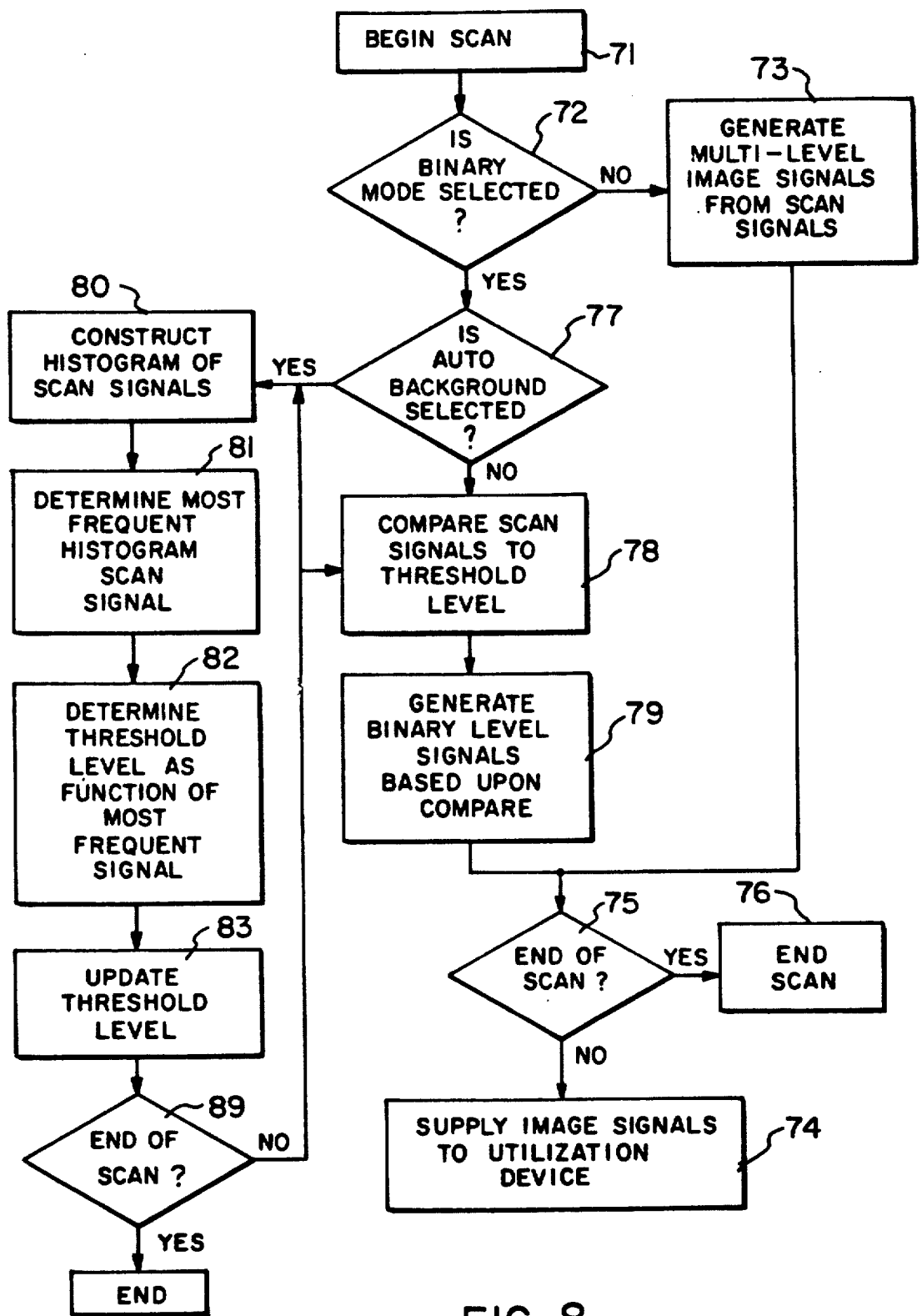
FIG. 8 is a showing of a method embodiment of the invention in flow chart form.

FIG. 8 discloses a method embodiment of the invention in flow chart form. As indicated by function block 71, consideration of the invention begins with the receipt of a scan request, as from host 45 of FIG. 4, for example. Decision block 72 now determines if the binary mode of scanner apparatus 10 has been selected, as by way of an active signal on conductor 42 in FIG. 1.

If the binary mode of operation has not been selected, function block 73 operates to generate multi level image signals that accurately correspond to the multi level scan signals supplied by A/D output 31 of FIGS. 3 and 4 (cable 19 of FIG. 1). These image signals are supplied to a signal utilization device (host 45 of FIG. 1) by operation of function block 74, until such time as the end of a document scan is detected by operation of decision block 75, whereupon the scan operation ends by operation of function block 76. The end of a scan operation may be detected, for example by the use of end of scan sensor 90 of FIG. 1, and/or by the use of means including motor position transducer 23, as is well known by those of skill in the art.

When the binary mode of operation has been selected, decision block 77 operates to determine if the auto background function has also been selected.

If the auto background function has not been selected, function block 78 is operable to compare the multi level scan signal magnitudes to a default threshold signal magnitude such as 54 of FIG. 5, and function block 79 thereafter operates to generate binary level image signals that are based upon this signal comparison. These binary level signals are then presented to the signal utilization device, by operation of function block 74, until such time as decision block 75 detects the end of a scan operation, as above mentioned.

When the auto background function has been selected, function blocks 78 and 79 operate to provide binary image signals as above described, and in addition, the threshold signal level of function block 78 is periodically updated or reinitialized by the operation of function blocks 80–83. The frequency of updating the threshold signal by means of which a binary decision is made relative to the each PEL scan signal may be frequent or infrequent. However, updating preferably occurs a number to times during each document scan.

More specifically, when decision block 77 detects that the auto background function has been selected, function block 80 operates to construct a histogram of a unit quantity of scan signals. From the content of this histogram, function block 81 determines the most frequent scan signal within the histogram. Function block 82 thereafter uses the magnitude of this most frequent scan signal to determine a new threshold signal level. The output of function block 83 is applied to function block 78 in order to effect an update of that function block's threshold level. The output of function block 83 is also applied to function block 80, thereby causing the threshold signal level recalculation to be repeated.

This recalculation of the threshold signal level to be used by function block 78 continues until an end of scan is detected, as indicated by the operation of decision block 89.

While the invention has been described with reference to a number of detailed embodiments thereof, those skilled in the art will readily visualize yet other embodiments which are within the spirit and scope of the invention. Thus, it is intended the present invention be limited solely by the content of the following claims.

What is claimed is:

1. Binary mode document scanner apparatus, comprising;

platen means for supporting a document to be scanned, light source means operable to provide a linear footprint of light at said platen for scanning the document, light sensitive array means having a plurality of individual light sensitive cells arranged in a line that is effectively coincident with said light footprint, means providing relative movement between the document and said light footprint, to thereby scan the document line by line, as said sensor cells detect the light intensity within individual picture elements (PELS) of said light footprint, and operate to provide individual PEL signals whose magnitudes are indicatative of said individual light intensity, binary image signal generating means connected to said array means and operable to provide binary image signals from said individual PEL signals by comparing the magnitude of said individual PEL signals to the magnitude of a single threshold signal, and then generating a binary image signal having a first or a second state that is dependent upon said comparison, collection means connected to said array means and operable to provide a collection of the PEL signal magnitudes that are provided by individual PELS within said light footprint, analyzing means connected to said collection means and operable to analyze said collection of signals in order to determine the most frequent occurring signal magnitude within said light footprint, and threshold setting means connected to receive an input from said analyzing means, and operable to provide a single output threshold signal to said binary image signal generating means, the magnitude of said single threshold signal being a function of only said most frequent occurring signal magnitude within said collection of signals.

2. The document scanner apparatus of claim 1 wherein said light source means includes means for providing a light footprint adapted to cover PELS whose light intensities define both the document's background tone and the document's image tone, and wherein said collection means includes means for providing a histogram of the signal magnitudes that are generated by said background tone document PELS and image tone document PELS and said analyzing means determines said most frequent occurring signal magnitude within said light footprint on the basis of said histogram.

3. The document scanner apparatus of claim 2 wherein said threshold setting means operates to provide said output threshold signal to said binary image signal generating means periodically during a scan of the document.

4. In a binary mode document scanner apparatus having multiple cell light sensitive array means operable to scan a document row by row, each cell of said array providing an output scan signal whose magnitude varies as a function of the reflectance characteristics of the document PEL viewed by the cell, and including image formatter means operable to compare the magnitude of said output scan signals to the magnitude of a single threshold signal, said image formatter means being operable to provide a binary image signal of one state or of a second state as a function of said magnitude comparison, a method of periodically adjusting the magnitude of said threshold signal as a function of only the background reflection of the document, the method comprising the steps of;

(1) segregating a predetermined number of said output scan signals in accordance with a plurality of predefined magnitude ranges thereof, (2) analyzing said segregated output scan signals to determine the one output scan signal magnitude range that is in the majority within a row, (3) adjusting the magnitude of said threshold signal as a function of said majority scan signal magnitude range, and (4) repeating steps (1)–(3) during the scanning of a document.

5. The method of claim 4 wherein said predetermined number of said output scan signals is provided by scanning a plurality of rows of the document.

6. The method of claim 5 wherein the document comprises a dark tone visual image on a light tone substrate material, and wherein said one output scan signal magnitude range that is in the majority is provided by document PELS containing only said light tone.

7. In binary mode document scanner apparatus wherein an illuminated document is scanned by light sensitive means to produce an individual scan signal for each individual document PEL, each of said scan signals having a magnitude related to the quantity of light that is reflected from a document PEL, and wherein the magnitude of said scan signals are compared to the magnitude of a single magnitude threshold signal in order to originate an image signal of a first or a second state as a result of said comparison, means for determining the magnitude of said threshold signal as a function of only the background reflection characteristics of the document, comprising:

threshold means containing said threshold signal, image formatting means connected to said light sensitive means and to said threshold means, operable to compare the magnitude of each of said scan signals to the magnitude of said single threshold signal, and operable to originate said image signal of said first or said second state as a result of said comparison, processor means connected to said light sensitive means and operable to receive a unit quantity of said scan signals in reoccurring cycles as the document is scanned, said processor means including memory means for receiving each of said unit quantities of scan signals and defining a histogram on the basis thereof, and means including said processor means connected to said threshold means and operable to maintain the single magnitude of said threshold signal as a function of only the scan signal magnitude that occurs most frequently in each of said unit quantity of scan signals as the document is scanned.

8. The scanner apparatus of claim 7 wherein said scan signals each comprise a multi-bit digital word, each magnitude of said word comprising a different reflectance characteristic for a document PEL, and said digital magnitudes spanning a range that exemplifies the document's background tone at one end of said magnitude range, and the document's most dense image tone at the opposite end of said magnitude range, wherein said memory means contains a plurality of storage locations, each location of which receives a count of the number of occurrences of individually different and predetermined digital word magnitudes within said range of magnitudes, and wherein the magnitude of said threshold signal is maintained solely as a function of the single storage location that contains said most frequently occurring scan signal digital word.

9. The scanner apparatus of claim 8 wherein said single threshold signal magnitude is maintained for each unit quantity of scan signals that is originated by the scanning of the document.

10. The scanner apparatus of claim 7 wherein said scan signals each comprise an 8-bit byte, wherein each of the 256 possible magnitudes of said byte comprising a different reflectance characteristic for a document PEL, and wherein said byte magnitudes span a magnitude range that exemplifies said document's background tone at one end of said magnitude range, and the document's most dense image tone at the opposite end of said magnitude range, wherein said memory means contains 16 storage locations, each location of which receives a count of the number of occurrences of individually different and predetermined byte magnitudes within said range of 256 possible magnitudes, and wherein the magnitude of said threshold signal is maintained solely as a function of the storage location that contains said most frequently occurring byte magnitudes.

11. The scanner apparatus of claim 10 wherein said threshold signal magnitude is maintained for each unit quantity of scan signal as is originated from the scanning of the document.

12. Binary mode document scanner apparatus operable to scan a document line by line and to thereby originate a scan signal for each document PEL, said document comprising a visual image that is viewed against a background color tone, said apparatus comprising:

image formatter means connected to receive said scan signals and operable to compare the magnitude of said scan signals to the magnitude of a single threshold signal and to provide a binary image output signal as a result of said comparison, the magnitude of said threshold signal being periodically and automatically changed in accordance with only the background color tone of said document, autobackground processing means including scan signal memory means, said processing means being connected to receive said scan signals and being operable to accumulate a given quantity of said scan signals in said memory means, said given quantity of scan signals including at least one signal of a magnitude between a maximum and a minimum signal magnitude of a document line, whereupon said processing means analyzes said accumulated scan signals to determine a magnitude of scan signal occurred most often within said given quantity of scan signals, and whereupon said processing means operates to provide a single output threshold signal of a magnitude that is established in accordance with only said most often occurring magnitude within said given quantity of scan signals, and means connecting the threshold signal output of said autobackground processing means to said image formatter means to thereby establish the magnitude of said threshold signal in accordance with only the background color tone of said document.

13. The binary mode document scanner apparatus of claim 12 wherein each of said scan signals comprise a multi-bit digital word whose range of possible magnitudes begins with a lowest magnitude all-0's word and ends with a highest magnitude all-1's word, one end of said magnitude range being associated with document PELS generally equivalent to said document's visual image, and the other end of said magnitude range being associated with document PELS generally equivalent to said document's background color tone, and wherein said most often occurring magnitude within said given quantity of scan signals comprises said scan signal magnitude associated with document PELS equivalent to said background color tone.

14. The binary mode document scanner apparatus of claim 13 wherein said autobackground processing means operates to divide said multi-bit digital word scan signal magnitude range into a plurality of sub-ranges covering said magnitude range from all 0's to all 1's, and wherein said given quantity of scan signals is accumulated by scanning a fixed portion of the document for each of said sub-ranges, and analyzing the scan signals provided by said fixed document portion for scan signal magnitudes within each of said sub-ranges.

15. A method for use in a document scanner, comprising the steps of:

scanning a document line by line and generating a plurality of output scan signals, each signal having a magnitude that varies as a function of a reflectance characteristic of a corresponding document pixel, periodically determining the output scan signal magnitude that is in the majority as said document is scanned, periodically adjusting the magnitude of a single threshold signal as a function of only said majority scan signal magnitude, and generating a binary image signal by comparing the magnitude of each output scan signal to said threshold signal.

16. The method of claim 15 wherein said document comprises a dark color tone visual image on light color tone substrate, and wherein said output scan signal magnitude that is in the majority is provided only by document PELS containing said light color tone.

* * * * *

UNITED STATES PATENT AND TRADEMARK OFFICE
CERTIFICATE OF CORRECTION

PATENT NO. : 5,201,014
DATED : April 6, 1993
INVENTOR(S) : Greg Degi, Craig Miller and Irene Stein It is certified that error appears in the above-indentified patent and that said Letters Patent is hereby corrected as shown below:

Col. 13, l. 59 -- after "array" insert --defining one document pixel (PEL) and each cell of said array--;

Col. 15, l. 26 -- between "the" and "magnitude" insert --single--;

Col. 15, l. 31 -- before "threshold" insert --single--;

Col. 15, l. 31 -- delete "signal" and insert therefor --signals--;

Col. 16, l. 23 -- after "comprises" insert --only--.

Signed and Sealed this

Fourteenth Day of March, 1995

Attest:

BRUCE LEHMAN

Attesting Officer

Commissioner of Patents and Trademarks